United States Patent [19]

Yamazumi et al.

[11] Patent Number: 5,042,108
[45] Date of Patent: Aug. 27, 1991

[54] SUCTION PIPE FOR A VACUUM CLEANER

[75] Inventors: Shuji Yamazumi; Hiroshi Kawakami, both of Youkaichi, Japan

[73] Assignee: Matsushita Electric Industrial Co., Ltd., Osaka, Japan

[21] Appl. No.: 525,282

[22] Filed: May 17, 1990

[30] Foreign Application Priority Data

May 23, 1989 [JP] Japan .................................. 1-130406

[51] Int. Cl.⁵ ................................................ A47L 9/00
[52] U.S. Cl. ........................................ 15/326; 181/224
[58] Field of Search ................... 15/326; 181/224, 225

[56] References Cited

U.S. PATENT DOCUMENTS

| 2,125,850 | 8/1938 | Norris | 15/326 |
| 2,188,428 | 1/1940 | Evans . | |
| 3,308,608 | 3/1967 | Brimberg | 15/326 X |
| 3,511,336 | 5/1970 | Rink et al. | 181/224 |
| 4,091,892 | 5/1978 | Hehmann et al. | 181/224 X |

FOREIGN PATENT DOCUMENTS

853854 11/1938 France .
2257850 1/1974 France .
455962 11/1936 United Kingdom .

Primary Examiner—Chris K. Moore
Attorney, Agent, or Firm—Panitch, Schwarze, Jacobs & Nadel

[57] ABSTRACT

A suction pipe for a vacuum cleaner is disclosed. The suction pipe comprises a hollow cylindrical body which is provided with sound-absorbing holes on a ceiling portion thereof, the ceiling portion extending in the air-inducing direction. A cover is attached to the outer surface of the cylindrical body so as to cover the ceiling portion thereof. A sound-absorbing material is placed between the ceiling portion and the cover, so that noise caused by the air sucked into the suction pipe is directed through the sound-absorbing holes of the ceiling portion and absorbed by the sound-absorbing material.

4 Claims, 7 Drawing Sheets

SUCTION PIPE FOR A VACUUM CLEANER

BACKGROUND OF THE INVENTION

1. Field of the Invention

The present invention relates to a suction pipe for a vacuum cleaner, and particularly relates to a suction pipe which has a sound-absorbing system.

2. Description of the Prior Art

Figures 10, 11:
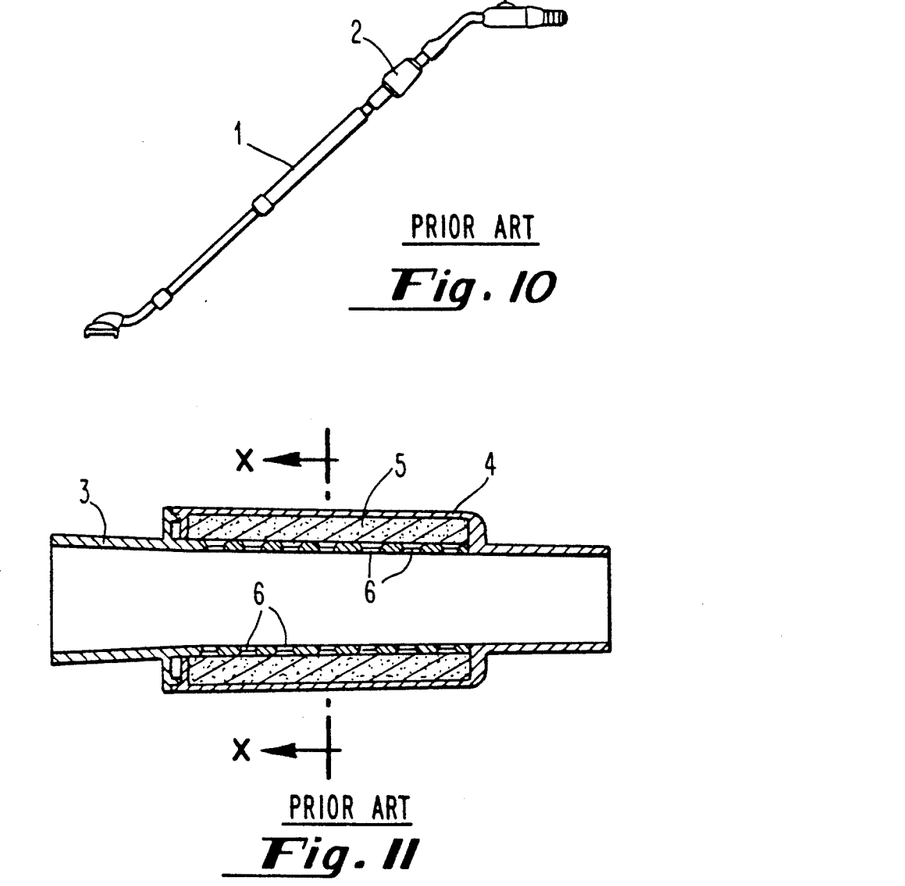
FIG. 10 is a side elevation showing a conventional suction pipe having a sound-absorbing system, which is connected to the other suction members of a vacuum cleaner.
FIG. 11 is a longitudinal sectional view of the conventional suction pipe with the sound-absorbing system shown in FIG. 10.
Figure 12:
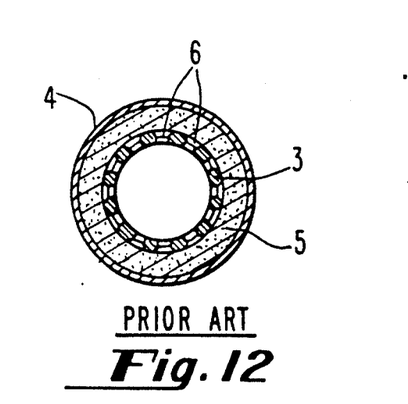
FIG. 12 is a cross-sectional view taken along the line X—X of FIG. 11.

A conventional suction pipe with a sound-absorbing system, which is designated by the reference numeral 2 in FIG. 10, is connected to a suction pipe 1 without a sound-absorbing system, so as to be used in the cleaning operation of a vacuum cleaner. FIGS. 11 and 12 show longitudinal and cross sectional views, respectively, of the suction pipe 2 with a sound-absorbing system. The suction pipe 2 includes an outer pipe 4 and an inner pipe 3, and also includes a sound-absorbing material 5 between the inner and outer pipes 3 and 4. The portion of the inner pipe 3 which is surrounded by the sound-absorbing material 5 is provided with holes 6. Noise which is caused by the sucked air and passing through the suction pipe 2 is directed through the holes 6 and absorbed by the sound-absorbing material 5.

In such a suction pipe with a sound-absorbing system, however, one pipe is surrounded by the other to contain a sound-absorbing material therebetween, so that the outer diameter of the entire suction pipe becomes considerably large. Thus, the user finds it difficult to handle the suction pipe with its large diameter, in the cleaning operation.

SUMMARY OF THE INVENTION

The suction pipe for a vacuum cleaner of this invention, which overcomes the above-discussed and numerous other disadvantages and deficiencies of the prior art, comprises: a hollow cylindrical body having sound-absorbing holes on a ceiling portion thereof, said ceiling portion extending in the air-inducing direction; a cover attached to the outer surface of said cylindrical body to cover said ceiling portion; and a sound-absorbing material disposed between said cover and said ceiling portion.

In a preferred embodiment, each of the sound-absorbing holes is tapered to allow its inner diameter to gradually become smaller toward the inside of the cylindrical body.

In a preferred embodiment, the inner surface of the ceiling portion is covered with a net.

In a preferred embodiment, the sound-absorbing material has matricidal and antibacterial properties.

Thus, the invention described herein makes possible the objective of providing a suction pipe which has a small outer diameter so as to be easily handled, and also has excellent noise absorbing properties.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figures 1, 2, 3:
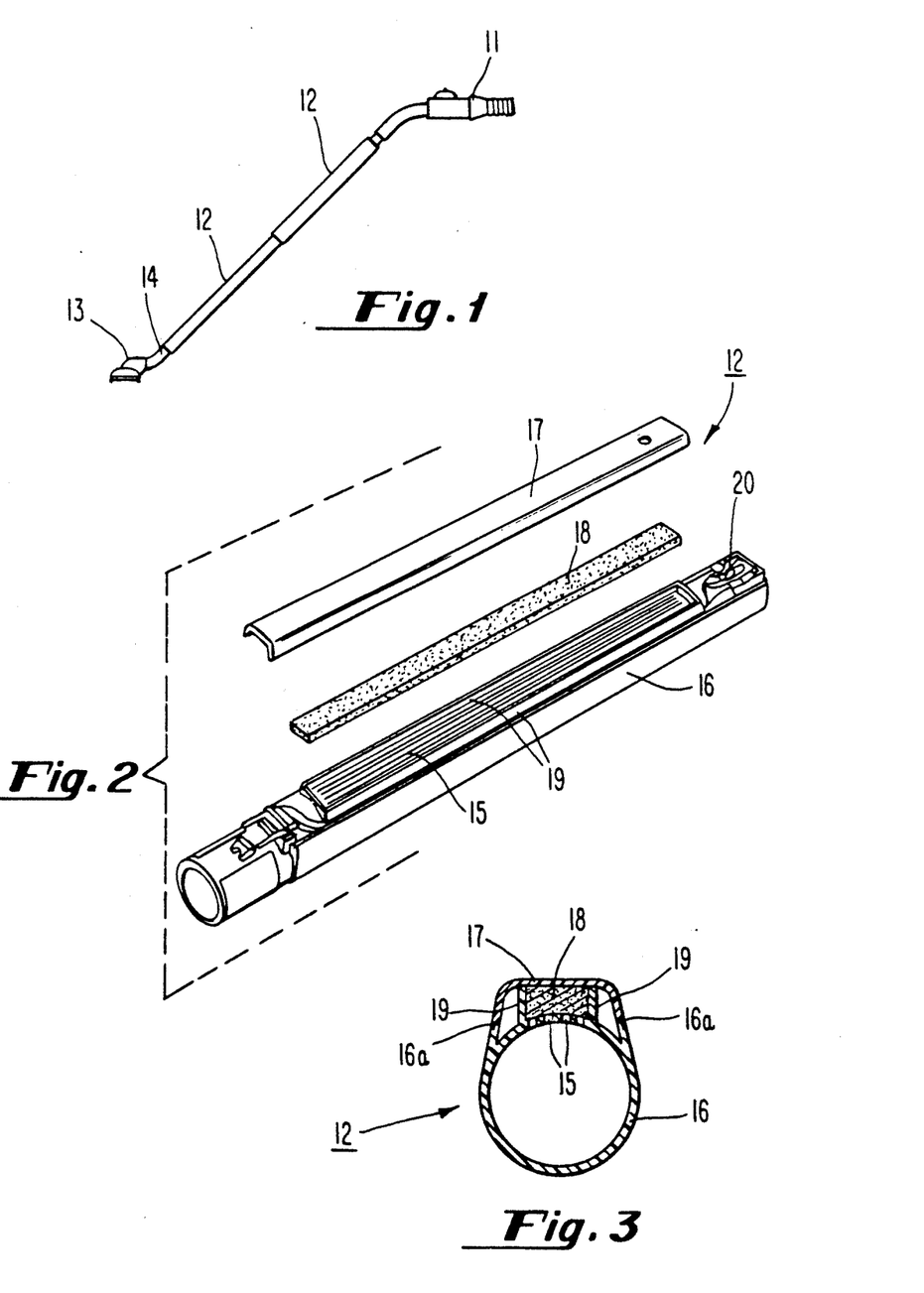
FIG. 1 is a side elevation showing a pair of suction pipes of this invention, which are connected to the other suction members of a vacuum cleaner.
FIG. 2 is an exploded perspective view of a first example of the suction pipe according to the invention.
FIG. 3 is a cross-sectional view showing the suction pipe of FIG. 2.

FIG. 1 shows suction members of a vacuum cleaner, including a pair of suction pipes of this invention connected to each other. When the vacuum cleaner is to be operated, a hose 11, two suction pipes 12 of this invention, and a connector 14 of a floor nozzle 13 are connected to each other in that order, and the other end of the hose 11 is connected to the body of the vacuum cleaner (not shown).

Examples of the suction pipe 12 of this invention will be described in detail below.

[Example 1]

The suction pipe 12 illustrated in FIGS. 2 and 3 comprises a hollow cylindrical body 16, a cover 17, and a sound-absorbing material 18 placed therebetween. The cylindrical body 16 has sound-absorbing holes 15 on a ceiling portion thereof, the ceiling portion extending in the direction in which air is induced into the body of the vacuum cleaner (this direction will be hereinafter referred to as "the air-inducing direction"). A partition wall 19 protrudes from the outer surface of the cylindrical body 16 so as to surround the ceiling portion of the cylindrical body 16 which has the sound-absorbing holes 15. The cover 17 is attached to the cylindrical body 16 to cover the ceiling portion thereof; the inner surface of the cover 17 is welded to the top of the partition wall 19, and the side ends of the cover 17 are also welded to ribs 16a located outside the partition wall 19 and on the outer surface of the cylindrical body 16. The sound-absorbing material 18 is placed inside the partition wall 19 and between the cylindrical body 16 and the cover 17.

One end of the cylindrical body 16 is provided with a hook 20, by which the suction pipe 12 is connected to another suction pipe or to the connector 14 of the floor nozzle 13, as shown in FIG. 1.

Each of the sound-absorbing holes 15 is tapered so that its inner diameter becomes gradually smaller toward the inside of the cylindrical body 16. This configuration allows the sound-absorbing material 18 to readily enter the holes 15 and also prevents the particles of dust sucked into the suction pipe 12 from coming into the holes 15. Also with this configuration, the air absorbed by the sound-absorbing material 18 is prevented from flowing back into the inside of the cylindrical body 16.

The sound-absorbing material 18, which is in the form of a plate and weighs 250 g to 500 g per square meter, has elasticity so that it vibrates due to the change in pressure when the power switch of the vacuum cleaner is turned off. This vibration causes fine particles such as those of sand and cement in the holes 15 to fall down to the inside of the cylindrical body 16, thereby preventing the holes 15 from becoming clogged. The sound-absorbing material 18 also has matricidal and antibacterial properties, thereby preventing the propagation of ticks, mites, germs, bacteria, and the like.

With the above-described construction, since the sound-absorbing holes 15 and the sound-absorbing material 18 are provided only on the ceiling portion of the cylindrical body 16 of the suction pipe 12, the outer diameter of the suction pipe 12 can be made smaller, as compared with that of the conventional suction pipe. Thus, the suction pipe 12 of this example can be easily handled.

Furthermore, the formation of the sound-absorbing holes 15 and the production of the cylindrical body 16 can be performed at the same time, and the welding of the cover 17 to the cylindrical body 16 can be performed also at this time. Thus, the process of producing the suction pipe can be simplified.

The sound-absorbing efficiency of the suction pipe of this example will now be described.

Figure 4A:
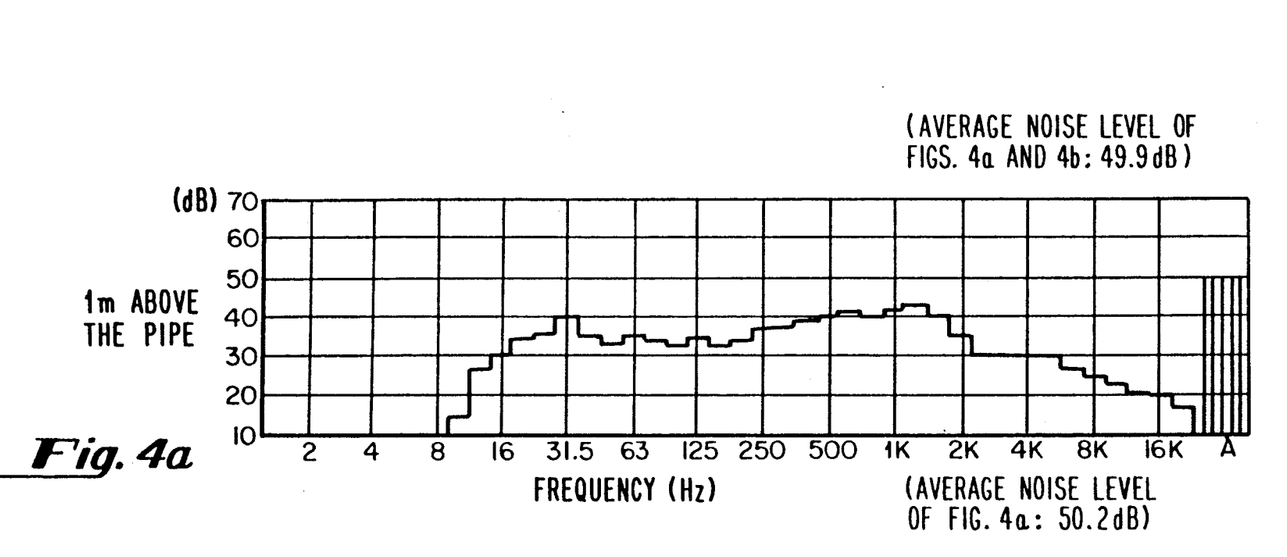
FIGS. 4a and 4b are graphs showing the results of noise-level tests performed on the suction pipe of FIG. 2.
Figure 4B:
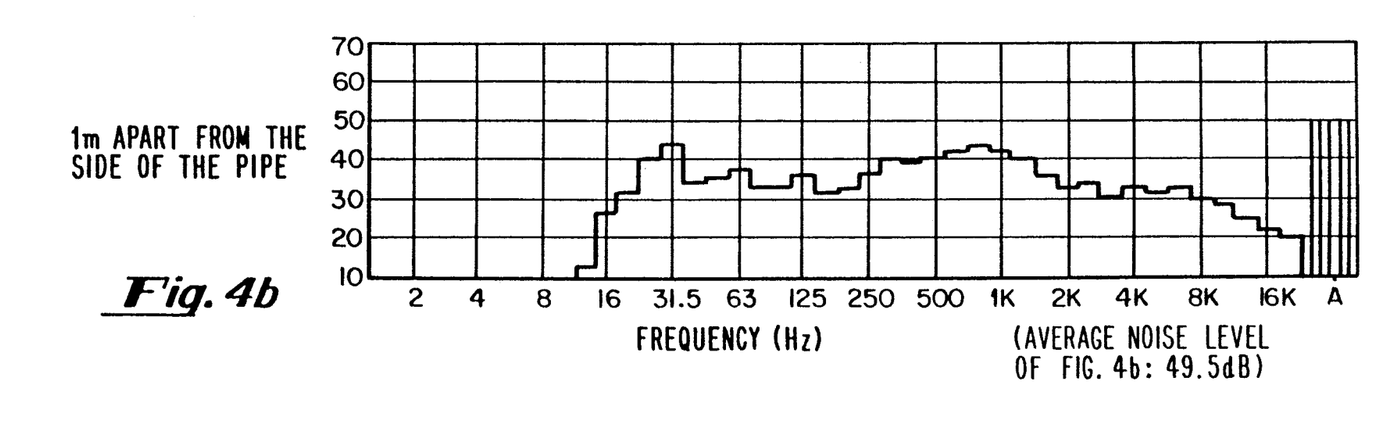

FIGS. 4a and 4b show the results of the noise-level tests performed on the suction pipe 12 of this example, in accordance with the Test Procedures under the Japanese Industrial Standard. FIG. 4a shows the levels of noise measured at a position one meter above the suction pipe 12, with respect to different frequencies of the noise. FIG. 4b shows those measured at a position one meter away in the horizontal direction from one side of the suction pipe (i.e., one meter away from the right or left side in FIG. 3). For comparison, a suction pipe with no sound-absorbing system was also tested under the same conditions, the results of which are shown in FIGS. 5a and 5b.

Figure 5A:
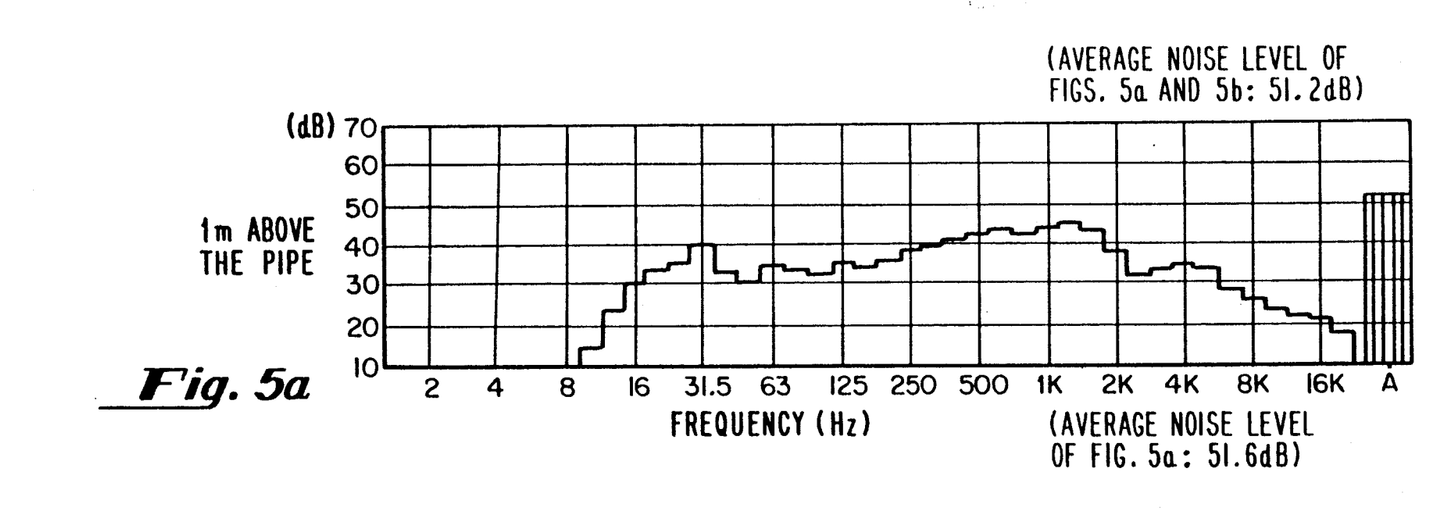
FIGS. 5a and tb are graphs showing the results of noise-level tests performed on a suction pipe without a sound-absorbing system.

Referring to FIG. 5a, when measured at the position one meter above the suction pipe without a sound-absorbing system, the noise levels were 44 dB at the frequency of 1 KHz, 37 dB at 2 KHz, and 34 dB at 4 KHz. Referring to FIG. 5b, when measured at the position one meter away in the horizontal direction from one side of the suction pipe without a sound-ceiling absorbing system, the noise levels were 45 dB at 1 KHz, 35 dB at 2 KHz, and 35 dB at 4 KHz.

Figure 5B:
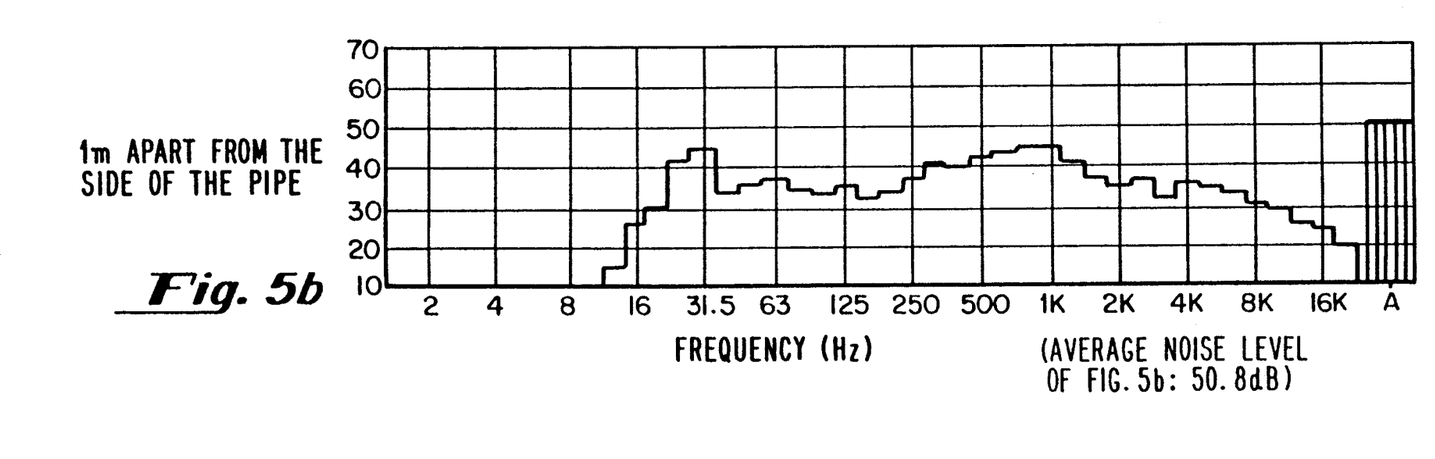

In contrast, as seen from FIGS. 4a and 4b, the noise levels of the suction pipe 12 of this example were 2 dB lower at 1 KHz, 2 dB lower at 2 KHz, and 3–5 dB lower at 4 KHz than the corresponding values obtained by the suction pipe without a sound-absorbing system shown in FIGS. 5a and 5b. The average level of all the values shown in FIGS. 4a and 4b is 1.3 dB lower than that of the values shown in FIGS. 5a and 5b. This means that the noise caused by the air sucked into the floor nozzle was reduced by the sound-absorbing system of the suction pipe 12.

[Example 2]

Figure 6:
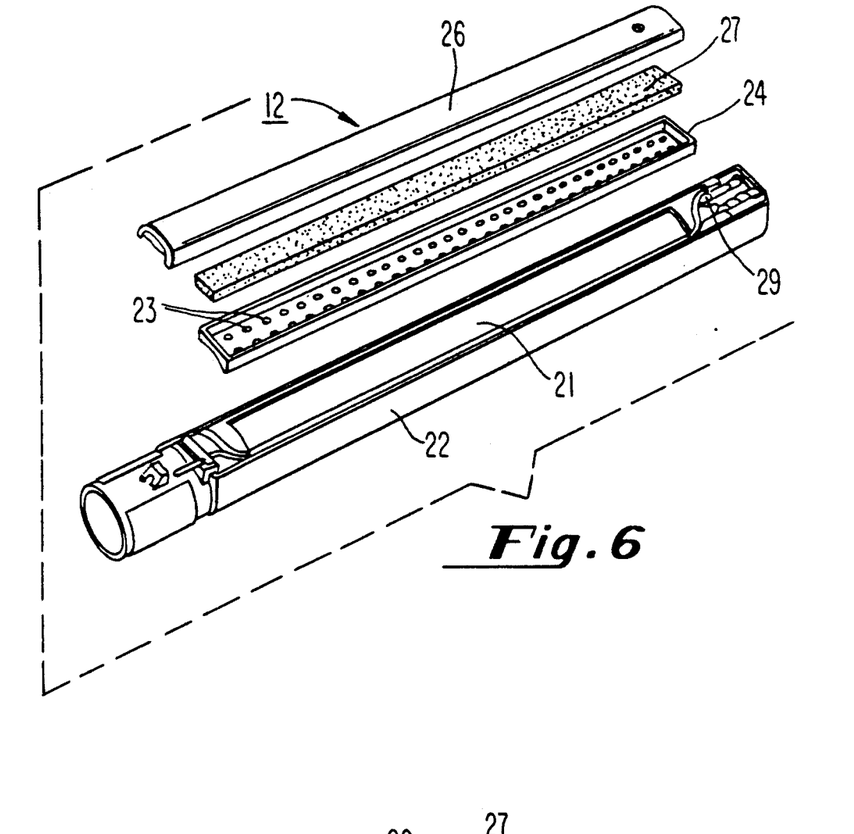
FIG. 6 is an exploded perspective view of a second example of the suction pipe according to the invention.
Figure 7:
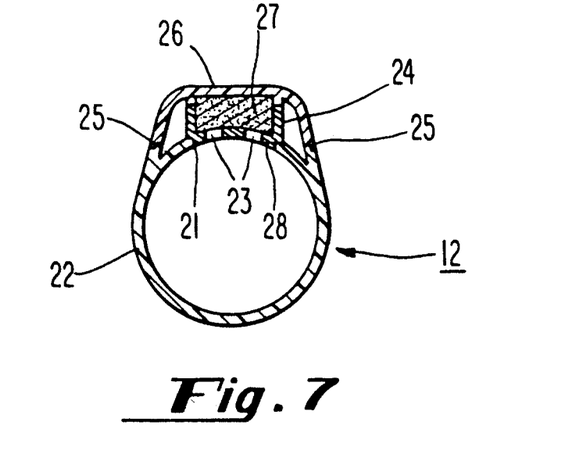
FIG. 7 is a cross-sectional view showing the suction pipe of FIG. 6.

FIGS. 6 and 7 show another example of the suction pipe 12 according to the invention, which comprises a hollow cylindrical body 22, an inner cover 24 having sound-absorbing holes 23 on the bottom wall thereof, an outer cover 26, and a sound-absorbing material 27. The cylindrical body 22 is provided with an opening 21 in the ceiling portion thereof, the opening 21 extending in the air-inducing direction. The inner cover 24 is fit into the opening 21 so that the side wall of the cylindrical body 22 and the bottom wall of the inner cover 24 having the sound-absorbing holes 23 define a cylindrical shape. The outer cover 26 is attached to the cylindrical body 22 to cover the ceiling portion thereof; the inside of the outer cover 26 is welded to the top of the inner cover 24, and the side ends of the outer cover 26 are welded to ribs 25 located on the outer surface of the cylindrical body 22 and outside the inner cover 24. The sound-absorbing material 27 is placed between the inner cover 24 and the outer cover 26.

The lower surface of the bottom wall of the inner cover 24 is covered with a net 28, which prevents dust particles from coming into the sound-absorbing holes 23. The net 28 and the inner cover 24 are integrally formed, thereby preventing the edge of the net 28 from fraying out or peeling off.

One end of the cylindrical body 22 is provided with a hook 29, by which the suction pipe 12 is connected to another suction pipe or to the connector 14 of the floor nozzle 13, as shown in FIG. 1.

In the same way as in Example 1, each of the sound-absorbing holes 23 is tapered so that its inner diameter becomes gradually smaller toward the inside of the cylindrical body 22. This configuration allows the sound-absorbing material 27 to readily enter the holes 23 and also prevents the particles of dust sucked into the suction pipe 12 from coming into the holes 23. Also with this configuration, the air absorbed by the sound-absorbing material 27 is prevented from flowing back into the inside of the cylindrical body 22.

Also in the same way as in Example 1, the sound-absorbing material 27, which is in the form of a plate and weighs 250 g to 500 g per square meter, has elasticity so that it vibrates due to the change in pressure when the power switch of the vacuum cleaner is turned off. This vibration causes fine particles such as those of sand and cement in the holes 23 to fall down to the inside of the cylindrical body 22, thereby preventing the holes 23 from becoming clogged. The sound-absorbing material 27 also has matricidal and antibacterial properties, thereby preventing the propagation of ticks, mites, germs, bacteria, and the like.

As described above, also in this example, the sound-absorbing holes 23 and the sound-absorbing material 27 are provided only on the ceiling portion of the cylindrical body 22 of the suction pipe 12, so that the outer diameter of the suction pipe 12 is made smaller, as compared with that of the conventional suction pipe. Thus, the suction pipe 12 of this example can be easily handled.

The noise-level tests were also performed on the suction pipe 12 of this example and on a suction pipe without a sound-absorbing system, in accordance with the Test Procedure under the Japanese Industrial Standard. The results are shown in FIGS. 8a and 8b, and in FIGS. 9a and 9b, in the same manner as in FIGS. 4a and 4b, and FIGS. 5a and 5b of Example 1.

Figures 9A, 9B:
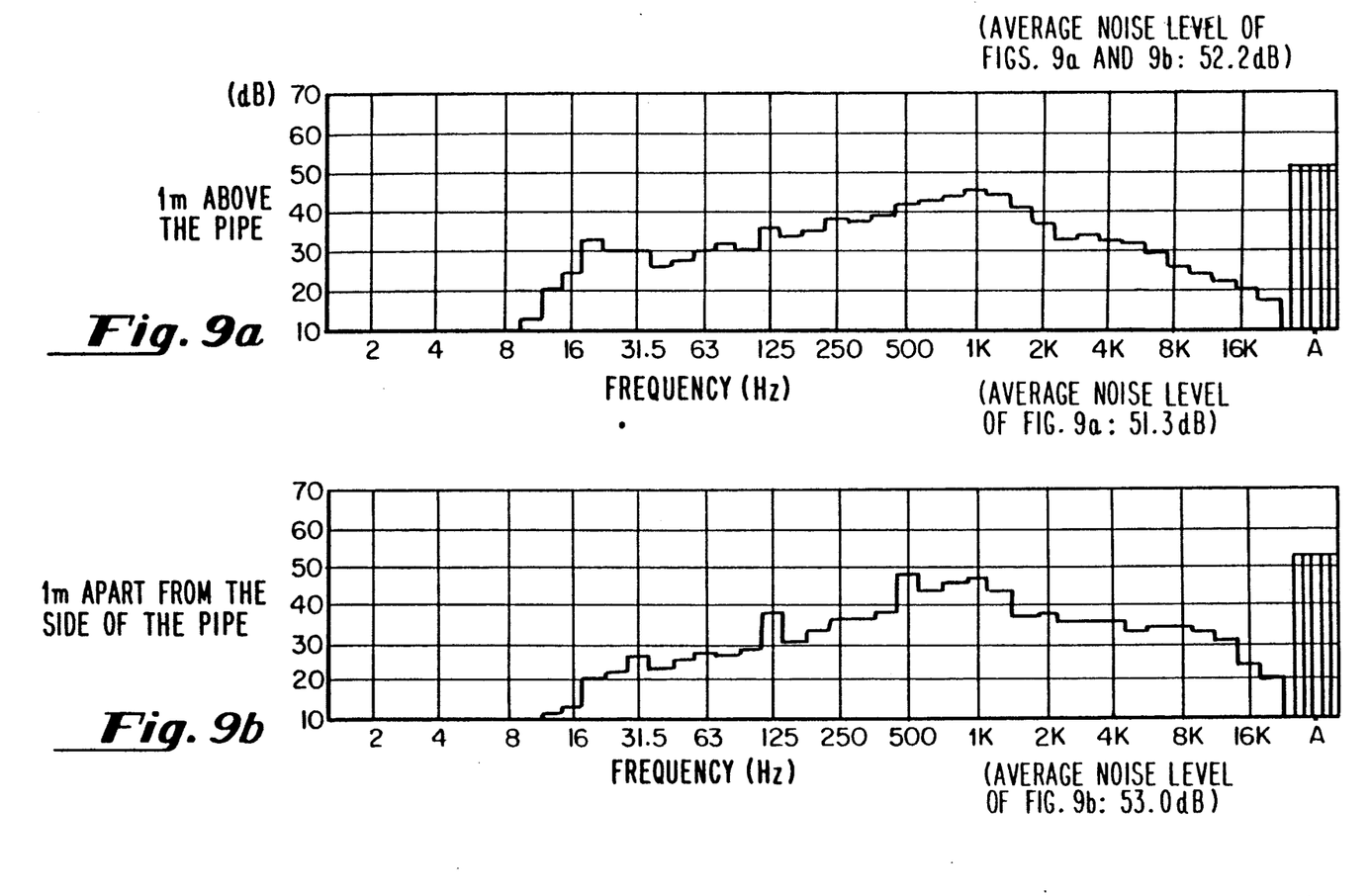
FIGS. 9a and 9b are graphs showing the results of noise-level tests performed on a suction pipe without a sound-absorbing system.

Referring to FIG. 9a, when measured at the position one meter above the suction pipe without a sound-absorbing system, the noise levels were 42 dB at the frequency of 500 Hz, 45 dB at 1 KHz, 36 dB at 2 KHz, and 32 dB at 4KHz. Referring to FIG. 9b, when measured at the position one meter away in the horizontal direction from one side of the suction pipe without a sound-absorbing system, the noise levels were 48 dB at 500 Hz, 47 dB at 1 KHz, 37 dB at 2 KHz, and 36 dB at 4 KHz.

Figure 8A:
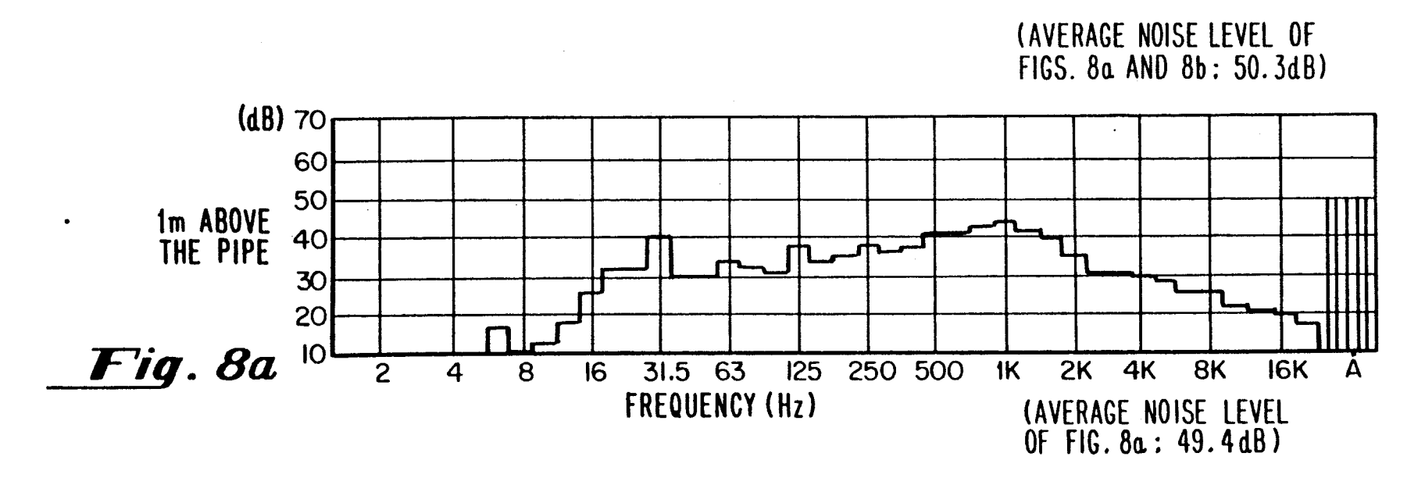
FIGS. 8a and 8b are graphs showing the results of noise-level tests performed on the suction pipe of FIG. 6.
Figure 8B:
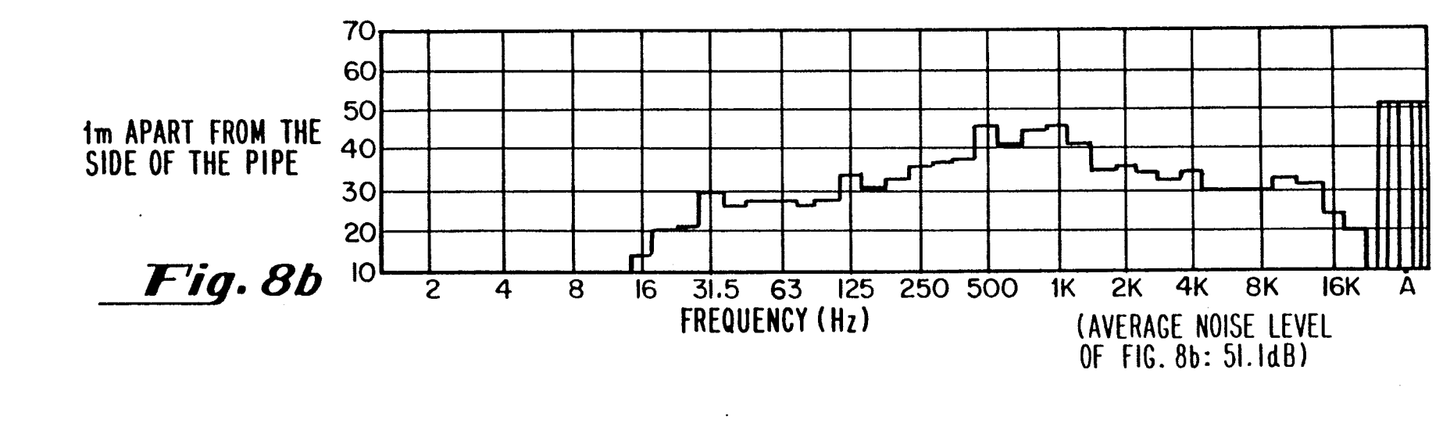

On the other hand, as shown in FIGS. 8a and 8b, the noise levels of the suction pipe 12 of this example were 1 to 2 dB lower at 500 Hz, 2 dB lower at 1 KHz, 1 to 2 dB lower at 2 KHz, and 2 dB lower at 4 KHz, than the corresponding values obtained by the suction pipe without a sound-absorbing system shown in FIGS. 9a and 9b. The average level of all the values shown in FIGS. 8a and 8b is 1.9 dB lower than that of the values shown in FIGS. 9a and 9b. This means that the noise caused by the air sucked into the floor nozzle was reduced by the sound-absorbing system of the suction pipe 12.

As described above, according to the invention, since the sound-absorbing holes and the sound-absorbing material are located only on the ceiling portion of the cylindrical body of the suction pipe, the outer diameter of the suction pipe can be made smaller and thus it can be easily handled. Furthermore, in the suction pipe of this invention, the dust particles are prevented from coming into the sound-absorbing holes due to the tapered configuration thereof, and as proved by the above noise-level tests for Examples 1 and 2, the noise caused by the sucked air can be sufficiently reduced.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A suction pipe for a vacuum cleaner, comprising:
    a hollow cylindrical body having sound-absorbing holes on a ceiling portion thereof, said ceiling portion extending in the air-inducing direction;
    a cover attached to the outer surface of said cylindrical body to cover said ceiling portion; and
    a sound-absorbing material disposed between said cover and said ceiling portion.

2. A suction pipe according to claim 1, wherein each of said sound-absorbing holes is tapered to allow its inner diameter to gradually become smaller toward the inside of said cylindrical body.

3. A suction pipe according to claim 1, wherein the inner surface of said ceiling portion is covered with a net.

4. A suction pipe according to claim 1, wherein said sound-absorbing material has matricidal and antibacterial properties.

* * * * *